(12) United States Patent
Chauvin

(10) Patent No.: US 6,782,663 B1
(45) Date of Patent: Aug. 31, 2004

(54) TWO PART VEHICLE DOOR

(75) Inventor: M. Rene Chauvin, Bressuire (FR)

(73) Assignee: Wagon Automotive, Bressuire Cedex (FR)

( * ) Notice: Subject to any disclaimer, the term of this patent is extended or adjusted under 35 U.S.C. 154(b) by 0 days.

(21) Appl. No.: 09/484,344

(22) Filed: Jan. 18, 2000

(30) Foreign Application Priority Data

Jan. 21, 1999 (FR) ............................................ 99 00890

(51) Int. Cl.[7] .................................................. B60J 5/04
(52) U.S. Cl. ............................. 49/502; 49/163; 49/166
(58) Field of Search .......................... 49/163, 164, 165, 49/166, 375, 376, 502; 296/146.1, 146.2, 146.5

(56) References Cited

U.S. PATENT DOCUMENTS

| | | | | |
|---|---|---|---|---|
| 2,094,413 A | * | 9/1937 | Schonitzer | 49/164 |
| 2,567,153 A | * | 9/1951 | Jackson et al. | 49/164 |
| 2,650,857 A | * | 9/1953 | Watter et al. | 49/164 |
| 3,799,607 A | | 3/1974 | Shakespear | |
| 5,062,240 A | * | 11/1991 | Brusasco | 49/348 |
| 5,560,671 A | * | 10/1996 | Ojanen et al. | 296/146.14 |
| 5,787,646 A | * | 8/1998 | Nakamori | 49/502 |
| 5,809,706 A | * | 9/1998 | Neaux | 52/204.51 |
| 5,829,195 A | * | 11/1998 | Ojanen | 49/166 |
| 5,907,897 A | * | 6/1999 | Hisano | 29/434 |
| 5,964,063 A | * | 10/1999 | Hisano et al. | 49/502 |
| 6,015,182 A | * | 1/2000 | Weissert et al. | 296/146.06 |
| 6,036,255 A | * | 3/2000 | Lester et al. | 296/146.1 |

FOREIGN PATENT DOCUMENTS

| | | |
|---|---|---|
| EP | 495 712 | 7/1992 |
| EP | 778 168 | 6/1997 |
| EP | 857 844 | 8/1998 |
| FR | 2 552 483 | 3/1985 |
| FR | 2 750 654 | 1/1998 |

* cited by examiner

Primary Examiner—Gregory J. Strimbu
(74) Attorney, Agent, or Firm—Merchant & Gould, P.C.

(57) ABSTRACT

A process for manufacturing a door for an automobile vehicle, and doors obtained using the process. In the process, the door is made in two parts assembled independently of each other. The two parts include a lower part without guide elements for a moving window, and an upper part containing a window. The lower and upper parts are then fixed to each other at an assembly area of the door, extending approximately horizontally and corresponding to the top of the lower part and the bottom of the upper part.

8 Claims, 2 Drawing Sheets

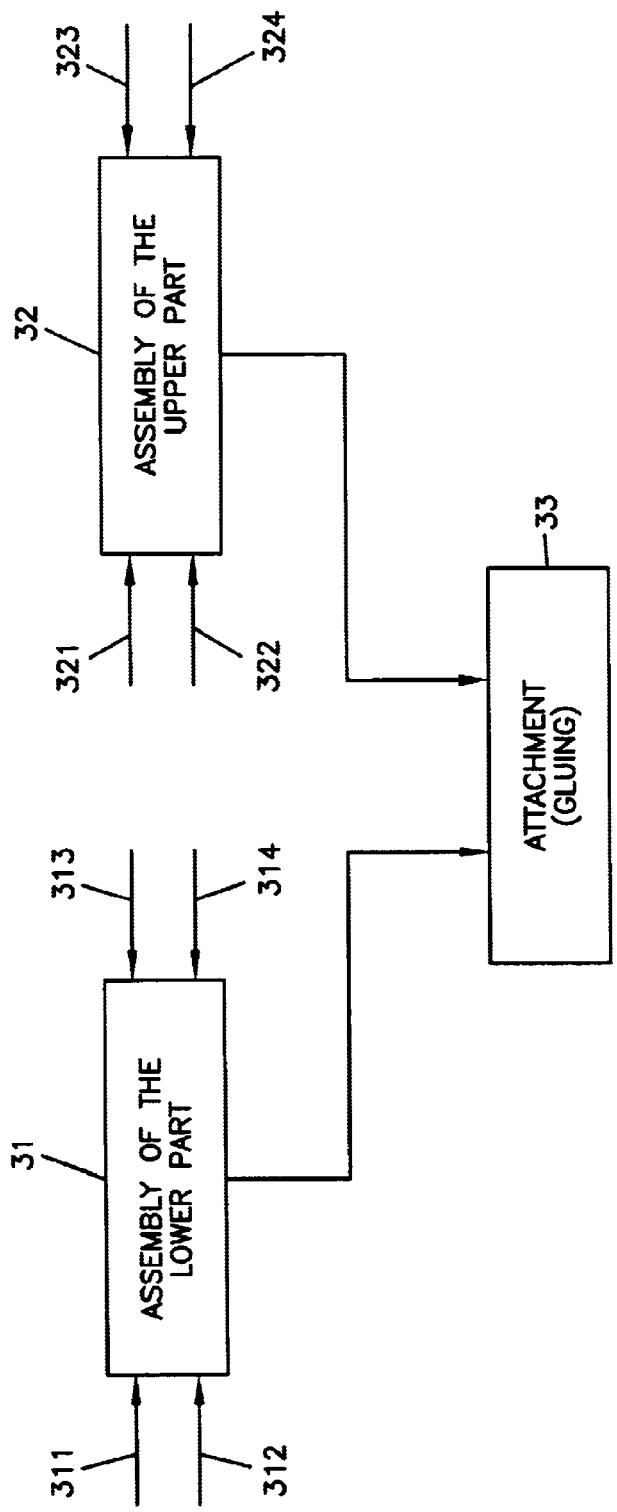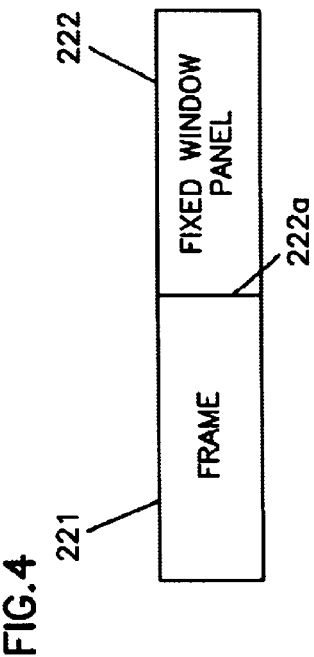

TWO PART VEHICLE DOOR

FIELD OF THE INVENTION

The domain of this invention is the manufacture of automobile vehicles. More precisely, the invention relates to the manufacture of doors for automobile vehicles.

BACKGROUND OF THE INVENTION

Conventionally, an automobile vehicle door has a solid lower part and an upper glazed part. The glazed part is usually surrounded by an upper frame inside which the window fits. This frame is formed in the door structure.

FIG. 1 shows an example of a door of this type, like most doors installed on vehicles at the present time. This type of door has a structural element 11 inside which door opening and locking means 12 are fitted, together with a window 13 and the mechanism 14 for sliding the window in a slit provided for it formed in the lower part of the door.

An outer bodywork panel 15, and an inner trim 16, are then added.

Doors of this type have a number of disadvantages. They involve a large number of components to be assembled, and their assembly is long and difficult, particularly for the sliding window 13 that must be positioned very precisely.

In the case of a manual or electrical mechanism, the equipment for moving the window 13 is complex, heavy and cumbersome.

Furthermore, the fact that the window can move into the lower part of the door causes a number of problems for safety (position and size of the lateral stiffeners 17), esthetics and ergonomy (size of storage pockets 18).

The presence of an upper frame fixed to the lower part on the structural element 11 and on the bodywork panel 15, also makes manufacturing and assembly of the door rather difficult, particularly since an appropriate seal must be placed in this frame for waterproofing.

Some manufacturers have designed vehicles in which the doors do not have upper frames, in which the window alone closes the upper part. Other problems arise in this case, particularly related to the overall stiffness and waterproofing.

Waterproofing is a serious problem in the slit through which the window slides inside the door. Regardless of how efficient these seals are, dust and moisture eventually penetrate inside the door and in the short or long term modify or degrade operation of the door and/or window opening mechanism.

SUMMARY OF THE INVENTION

The invention is intended to correct these various disadvantages in prior art.

More precisely, one objective of the invention is to provide a process for manufacturing a door for an automobile vehicle that is simpler and faster to use than known manufacturing processes.

Another objective of the invention is to provide a door, and the corresponding manufacturing process, that contains fewer components and has a lighter weight than known techniques.

Another objective of the invention is to provide a similar door with improved waterproofing, without any complex or expensive special equipment.

Another objective of the invention is to provide a manufacturing process that can be used to make doors with new characteristics, particularly concerning esthetics and ergonomy, and particularly doors that provide more space for passengers and/or internal storage pockets.

These objectives, and others which will become clearer later, are achieved according to the invention using a process for manufacturing a door for an automobile vehicle, in which the door is made in two parts assembled independently of each other:

- a lower part without guide means for a moving window, and
- an upper part containing a window, the lower and upper parts then being affixed to each other at an assembly area of the door, extending approximately horizontally and corresponding to the top of the lower part and the bottom of the upper part.

Thus, the invention is based on a quite new and not obvious approach to making doors for automobile vehicles.

Conventionally, the upper part of a door is physically connected to its lower part at the beginning of assembly through the presence of a frame formed in the same bodywork element and/or by the presence of means enabling the window to slide. According to the invention, the two parts are independent and they are only fixed together when they are finished.

There are no elements that move and/or are shared between the two parts. They are simply fastened together. They are fastened at an assembly area which corresponds approximately to the bottom of the upper part (area in which the slit is formed through which the window slides conventionally in known types of doors).

Advantageously, the upper part of the door comprises means of closing the window, comprising a fixed window panel and at least one mobile window panel, the mobile window panel being used to open or close an opening formed in the fixed window panel.

In other words, the upper part can advantageously be fitted with a "flush" window using the technique developed by the applicant for this patent application In this case, the mobile window panel is preferably mounted on at least one support and/or guide element (for example rails) fixed to the fixed window panel.

According to one advantageous embodiment of the invention, the upper part of the door comprises a frame or at least one approximately vertical upright on its inner face.

Preferably, at least one of the ends of at least one of the support and/or guide elements is fixed to the frame or the approximately vertical uprights of the closing means.

Thus, if the fixed window panel is accidentally broken, the moving panel remains in position and cannot injure the driver or his passenger.

According to another aspect of the invention, the step in which a lower part of the door is made advantageously includes the assembly of an outer bodywork panel 212 and an inner trim on a structural element.

Therefore, compared with conventional methods, these operations are very simple, particularly in that there are no window sliding means and no upper frame (which would have to be fitted with a seal).

The attachment step can involve at least one of the operations belonging to the group including gluing, welding, brazing or riveting.

According to a first embodiment of the invention, the mobile window panel is mounted on two support and/or guide elements, so as to slide in a plane approximately parallel to the plane formed by the fixed window panel.

In particular, the mobile window panel may be mounted to fit in the plane formed by the fixed window panel in the closed position.

For example, its mechanism can be broken down into two independent displacements:

a locking/unlocking displacement perpendicular to the plane formed by the fixed window panel, and enabling passage from the plane formed by the fixed window panel to a sliding plane approximately parallel to the plane formed by the fixed window panel;

displacement by sliding in the sliding plane.

According to one approach, the mobile window panel may have a continuous mechanism, such that the plane formed by the mobile window moves gradually into a sliding plane approximately parallel to the plane formed by the fixed window panel.

According to different embodiments, the sliding plane is located inside the vehicle or outside the vehicle.

In another embodiment, the mobile window panel is mounted to swing around an axis of rotation parallel to the plane formed by the fixed window panel.

The invention also relates to doors obtained by using the process described above.

BRIEF DESCRIPTION OF THE DRAWINGS

Other characteristics and advantages of the invention will appear after reading the following description of a preferred embodiment of the invention given as a simple illustrative and non-limitative example, and the drawings in which:

FIG. 3 is a simplified block diagram of the process for manufacturing a door like that illustrated in FIG. 2; and FIG. 4 is a schematic illustration of the frame connected to the fixed window panel at only the inner surface of the fixed window panel.

DETAILED DESCRIPTION OF THE PREFERRED EMBODIMENT(S)

As mentioned above, the invention proposes a completely new approach to making doors for automobile vehicles, based on manufacture in two independent parts fixed together for example by gluing.

Figure 1:
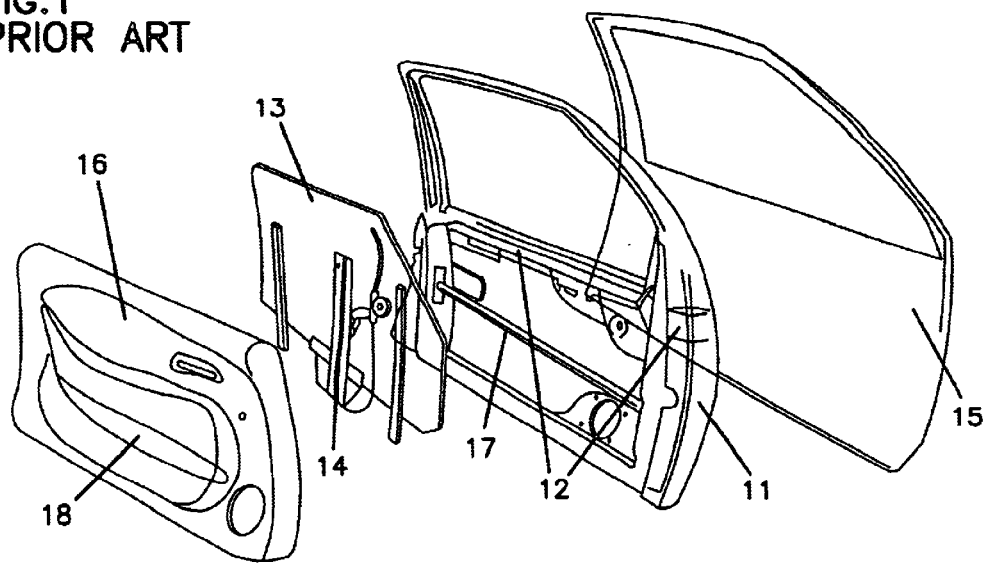
FIG. 1 shows an exploded view of a known type of door.
Figure 2:
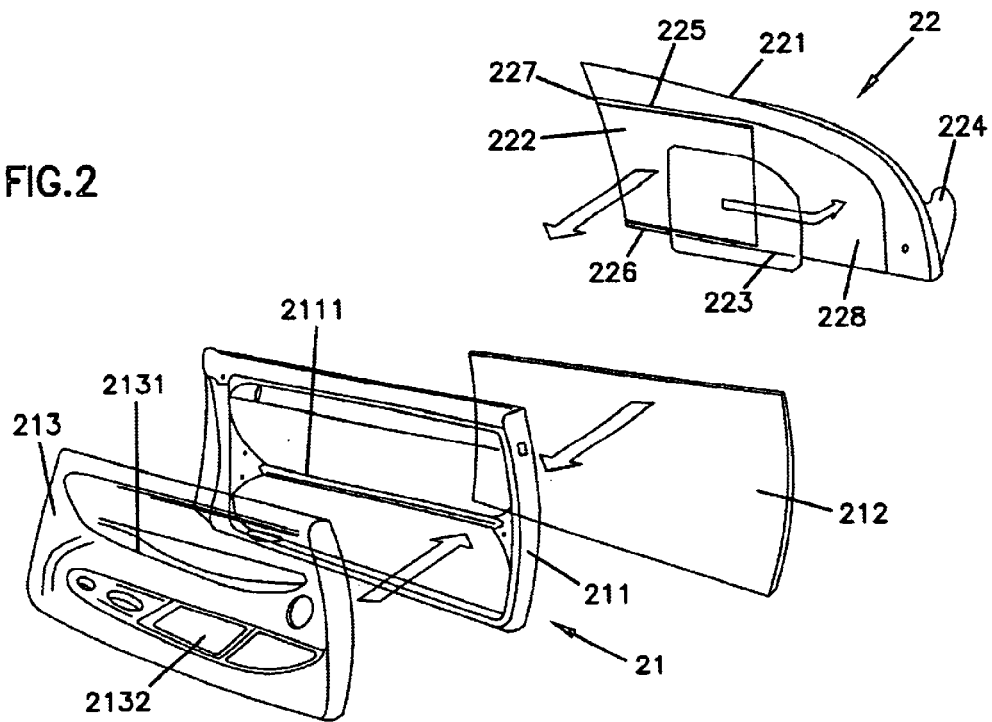
FIG. 2 illustrates an exploded view of a door according to the invention.

FIG. 2 shows an exploded view of an example of this type of door. It comprises lower part 21 and an upper part 22. There are no moving elements cooperating with the parts. On the contrary, the two parts are completely independent of each other and are fixed to each other permanently in a fixed manner at the end of manufacturing.

The lower part 21 comprises three main components: a structural element 211 into which an outer bodywork panel 212 and a inner trim 213 are fitted.

Means of opening and locking the door are conventional in themselves and are not shown. They are fitted on the structural element 211.

Other advantages of the invention can clearly by seen in this lower part 21:

ease of assembly, since only three components (plus the locking means) are necessary;

reduction in the weight of the assembly due to the lack of the sliding window and the corresponding mechanism;

a gain in volume, since the housing 2131 and the elbow rest 2132 formed in the trim 213 can (at least partially) penetrate inside the volume defined by the structural element 211;

simplification of the assembly and an improvement to side stiffeners 2111, since there are no constraints due to a sliding window;

possibility of new designs and ergonomic choices;

elimination of all waterproofing problems, since there are no longer any openings on this lower part 21.

The upper part 22 is provided with a single-piece, fixed window panel 222 made of glass or a similar material, and a movable window panel 223. A frame 221 fitted on the inside face 222a (facing the inside of the vehicle), as schematically illustrated in FIG. 4, surrounds the window panel 222. Obviously, the frame 221 could be reduced to only two approximately vertical uprights, possibly over only part of the height of the window panel 222.

Note that there is no visible external frame, such that a flush, esthetic and aerodynamic appearance can be obtained. The inner frame 221 provides stiffness, and if necessary holds the rails (described later) in position.

Although the window panel 222 is fixed, it is desirable that the upper part 22 defines an opening 228 that is closed by the movable window panel 223 to accommodate the needs and wishes of the user. In this case, the opening system is formed in the upper part 22 independently of the lower part 21. The window panels 222, 223 advantageously form a "flush" window like that developed by the applicant of this patent and for example described in patent application EP-0 778 168 (U.S. Pat. No. 5,809,706).

More generally, the relative movement of the mobile window panel 223 with respect to the fixed panel 222 may be of any appropriate type independently of the structure of the door according to the invention.

In particular, the mobile panel(s) 223 could be designed to slide in a plane approximately parallel to the plane formed by the mobile panel 223.

In one simplified embodiment, the mobile panel 223 is guided to slide along rails 225, 226 that comprise an internal support and guide seal. In this case, it is beneficial to provide waterproofing means when the mobile panel 223 is in the closed position.

According to another embodiment, the mobile panel 223 does not remain in a single plane parallel to the fixed window panel 222, but rather lies in the plane of the fixed window panel 222 in the closed position to close the opening 228. Thus, waterproofing and the esthetic appearance are improved at the price of a more complex guidance, the panel 223 looking like a portion of the bodywork without any visual interruption when in the closed position.

The mobile panel 223 may be guided in a single progressive operation, as suggested in document EP-778 168 (U.S. Pat. No. 5,809,706) mentioned above. According to another technique, the movement of the mobile panel 223 may be broken down into two separate movements:

a sliding movement parallel to the plane formed by the fixed window panel 222;

a locking/unlocking movement perpendicular to this plane.

For example, this type of movement is described in document EP-0 857 844, deposited by the applicant who deposited this patent application.

One example of such a window is shown in FIG. 2. Therefore, the window comprises a fixed panel 222, for example made of a transparent plastic material, in which an opening 228 has been formed that is closed off or opened by the mobile panel 223.

In the two documents mentioned above, the mobile panel 223 slides inside the vehicle. However, it is possible that sliding takes place outside the vehicle, by adapting hinge devices supporting the mobile panel 223 and installed in the two rails for this purpose.

According to another approach, the mobile panel 223 may tilt instead of slide. In this case a single rail may be sufficient. Document EP-0 778 168 (U.S. Pat. No. 5,809, 706) describes an example embodiment of this type.

Finally, and obviously, several mobile panels may be provided, possibly with different assemblies (for example one sliding part and one tilting part).

Similarly, the fixed window panel may be made in one or several parts and from any appropriate material. It may be partially translucid, and integrated into the guide rails of the mobile panel at its manufacturing stage.

Advantageously, rails 225 and 226 supporting the mobile panel extend (227) as far as the frame (or the uprights) and are fixed to this frame. They may also be integrated into the frame itself, particularly for the lower frame. Thus, if the fixed window panel 222 is accidentally broken, the mobile panel 223 remains in position held by the rail, and there is no risk of injuring the driver or his passenger.

Furthermore, note that the panel 223 is not necessarily absolutely plane. Obviously, its surface could be curved, particularly to follow the lines and shape of the vehicle bodywork. Consequently, the term "plane" (plane of the fixed window panel, sliding plane) must obviously be understood as referring to the surface of the door. In particular, sliding may take place along a curved trajectory provided that the rails and hinge means contained in them are designed for this purpose.

This type of window has many advantages in terms of ease of manufacture, weight, cost, esthetics, etc. These various aspects are discussed in the documents mentioned above.

Advantageously, a rear view mirror 224 is mounted directly on the upper part 22, and more precisely on the frame 221 and/or the fixed window panel 222.

Once each of the parts 21 and 22 have been assembled, they are fixed to each other to form the finished door. FIG. 3 shows this manufacturing process.

As mentioned above, the manufacture of a door according to the invention comprises three main steps:

assembly 31 of the lower part of the door;
assembly 32 of the upper part of the door;
attachment 33 of these two lower and upper parts, for example by gluing.

In particular, assembly of the lower part includes reception of the structural element 311, placement of locking means 312, then the inner trim 313 and the outer bodywork panel 314. No opening (slit) is provided to enable the passage of a sliding window.

The assembly 32 of the upper part is made independently and in particular comprises reception of the fixed window panel 321 of the window, assembly of the rails 322 (unless they are made directly in the body of the fixed window panel) and placement of the mobile panel 323, and appropriate locking and waterproofing means. The assembly is then placed on the frame 324.

Finally, the base of the frame 324 and the top of the lower part are fixed together 33. Preferably, they are fixed together by providing means of assisting and placing the two parts with respect to each other, such as a groove on the lower part into which the upper part will fit (possibly after placing glue and/or a seal in the groove).

What is claimed is:

1. A door for an automobile vehicle, comprising:
   a lower door part having an outer bodywork panel and an inner trim panel; and
   a separate upper door part that comprises:
   a) a window assembly including a fixed window panel having an inner surface that is adapted to face an interior of the vehicle upon which the door is to be mounted, and at least one movable window panel adjacent said fixed window panel and adapted to open and close an opening in the upper door part;
   b) a frame connected to and supporting said window assembly, said frame is connected to said fixed window panel at only the inner surface of said fixed window panel; and
   c) support elements connected to said frame, said support elements movably supporting said movable window panel such that said movable window panel is movable so as to open and close said opening;
   wherein said lower and upper door parts are fixed to each other along an entire length of an assembly area of said door by a connection selected from the group consisting of gluing, welding, brazing and riveting, wherein said assembly area extends approximately horizontally and corresponds to a top of said lower door part and a bottom of said upper door part, wherein said assembly area extends substantially an entire length of said upper door part, and wherein the lower door part does not include guide means for a moving window disposed below the assembly area between said outer bodywork panel and said inner trim panel.

2. A door according to claim 1, wherein said support elements comprise rails fixed to said frame.

3. A door according to claim 2, wherein said movable window panel is movable in a plane parallel to a plane defined by said fixed window panel.

4. A door according to claim 1, wherein said lower door part comprises a structural element, said outer bodywork panel and inner trim panel being connected to said structural element.

5. A door for an automobile vehicle, comprising:
   a lower door part having an outer bodywork panel and an inner trim panel; and
   a separate upper door part that comprises:
   a) a window assembly including a fixed window panel having an inner surface that is adapted to face an interior of the vehicle upon which the door is to be mounted, and at least one movable window panel adjacent said fixed window panel and adapted to open and close an opening in the upper door part;
   b) support elements connected to said fixed window panel at only the inner surface thereof, said support elements movably supporting said movable window panel such that said movable window panel is movable so as to open and close said opening;
   wherein said lower and upper door parts are fixed to each other along an entire length of an assembly area of said door by a connection selected from the group consisting of gluing, welding, brazing and riveting, wherein said assembly area extends approximately horizontally and corresponds to a top of said lower door part and a bottom of said upper door part, wherein said assembly area extends substantially an entire length of said upper door part, and wherein the lower door part does not include guide means for a moving window disposed below the assembly area between said outer bodywork panel and said inner trim panel.

6. A door according to claim 5, wherein said support elements comprise rails fixed to said fixed window panel.

7. A door according to claim 6, wherein said movable window panel is movable in a plane parallel to a plane defined by said fixed window panel.

8. A door according to claim 5, wherein said lower door part comprises a structural element, said outer bodywork panel and inner trim panel being connected to said structural element.

* * * * *